(12) United States Patent
Westhues et al.

(10) Patent No.: US 9,830,000 B2
(45) Date of Patent: Nov. 28, 2017

(54) ACTIVE STYLUS SYNCHRONIZATION

(71) Applicant: Microsoft Technology Licensing, LLC, Redmond, WA (US)

(72) Inventors: Jonathan Westhues, Portland, OR (US); Tianzhu Qiao, Portland, OR (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 234 days.

(21) Appl. No.: 14/569,544

(22) Filed: Dec. 12, 2014

(65) Prior Publication Data

US 2016/0170506 A1    Jun. 16, 2016

(51) Int. Cl.
  *G06F 3/0354*    (2013.01)
  *G06F 3/041*    (2006.01)
  *G06F 3/044*    (2006.01)

(52) U.S. Cl.
  CPC .......... *G06F 3/03545* (2013.01); *G06F 3/044* (2013.01); *G06F 3/0416* (2013.01); *G06F 2203/04104* (2013.01); *G06F 2203/04106* (2013.01)

(58) Field of Classification Search
  None
  See application file for complete search history.

(56) References Cited

U.S. PATENT DOCUMENTS

| | | | |
|---|---|---|---|
| 3,981,559 A | * | 9/1976 | Channin ........... G02F 1/134309 |
| | | | 349/141 |
| 5,576,737 A | * | 11/1996 | Isozaki ................ G09G 3/3685 |
| | | | 345/210 |
| 5,844,535 A | * | 12/1998 | Itoh ..................... G09G 3/3659 |
| | | | 345/103 |
| 5,877,459 A | | 3/1999 | Prater |
| 6,124,848 A | | 9/2000 | Ballare et al. |
| 6,239,788 B1 | | 5/2001 | Nohno et al. |
| 8,537,125 B2 | | 9/2013 | Mamba et al. |

(Continued)

FOREIGN PATENT DOCUMENTS

WO    2014145872 A1    9/2014

OTHER PUBLICATIONS

ISA European Patent Office, International Search Report and Written Opinion Issued in Application No. PCT/US2015/063558, dated Apr. 6, 2016, WIPO, 10 Pages.

(Continued)

*Primary Examiner* — Kent Chang
*Assistant Examiner* — Nathan Brittingham
(74) *Attorney, Agent, or Firm* — Alleman Hall Creasman & Tuttle LLP

(57) ABSTRACT

A touch-sensing system comprises an active stylus including a probe electrode and associated sensory logic. The sensory logic is configured to receive a synchronization pulse sequence via the probe electrode between consecutive touch-sensing frames of a capacitive touch screen, to use the synchronization pulse sequence to synchronize a local row counter of the sensory logic to a remote row counter of the capacitive touch screen, to receive an excitation pulse via the probe electrode within a given touch-sensing frame, and to use the excitation pulse to maintain synchronization between the local row counter and the remote row counter.

19 Claims, 11 Drawing Sheets

(56) References Cited

U.S. PATENT DOCUMENTS

| | | |
|---|---|---|
| 8,619,047 B2 | 12/2013 | Westhues |
| 8,797,301 B2 | 8/2014 | Ryshtun et al. |
| 2004/0088609 A1* | 5/2004 | Eckhardt .............. H04B 1/7085 |
| | | 714/700 |
| 2007/0035417 A1* | 2/2007 | Kiriyama ........... G01D 5/24404 |
| | | 341/8 |
| 2008/0128180 A1* | 6/2008 | Perski .................... G06F 3/046 |
| | | 178/18.03 |
| 2010/0155153 A1* | 6/2010 | Zachut ............... G06F 3/03545 |
| | | 178/18.03 |
| 2010/0252335 A1 | 10/2010 | Orsley |
| 2011/0155479 A1 | 6/2011 | Oda et al. |
| 2011/0175851 A1* | 7/2011 | Do ....................... G06F 3/0386 |
| | | 345/175 |
| 2012/0013555 A1* | 1/2012 | Maeda ................ G06F 3/03545 |
| | | 345/173 |
| 2012/0050207 A1* | 3/2012 | Westhues ........... G06F 3/03545 |
| | | 345/174 |
| 2012/0050231 A1* | 3/2012 | Westhues ........... G06F 3/03545 |
| | | 345/179 |
| 2012/0327041 A1 | 12/2012 | Harley et al. |
| 2013/0106718 A1 | 5/2013 | Sundara-Rajan |
| 2013/0207926 A1* | 8/2013 | Kremin ................. G06F 3/0383 |
| | | 345/174 |
| 2013/0278550 A1 | 10/2013 | Westhues |
| 2014/0049478 A1 | 2/2014 | Brunet et al. |
| 2014/0168116 A1* | 6/2014 | Sasselli ................ G06F 3/0416 |
| | | 345/173 |
| 2014/0176495 A1* | 6/2014 | Vlasov ................... G06F 3/044 |
| | | 345/174 |
| 2014/0316729 A1* | 10/2014 | Kremin ................ G06F 3/0416 |
| | | 702/65 |
| 2016/0004338 A1* | 1/2016 | Hsu ..................... G06F 3/03545 |
| | | 345/173 |
| 2016/0139732 A1* | 5/2016 | Takeda .................. G06F 3/044 |
| | | 345/174 |
| 2016/0170506 A1* | 6/2016 | Westhues ........... G06F 3/03545 |
| | | 345/174 |
| 2017/0060276 A1* | 3/2017 | Qiao ....................... G06F 3/046 |

OTHER PUBLICATIONS

"Capacitive Touch Screen Technology", Retrieved on: Nov. 20, 2014 Available at: http://www.styluscentral.com/Capacitive-Touch-Screen-Technology.html.

* cited by examiner

ACTIVE STYLUS SYNCHRONIZATION

BACKGROUND

Capacitive touch-sensing technology is especially suitable for multi-touch tracking and for use over a display. State-of-the-art capacitive touch screens reliably track touch from one or more fingers of a user, or from a stylus held in the user's hand. In contrast to a passive stylus, which mimics the capacitive coupling of a finger on the touch screen, an active stylus uses active charge-sensing and charge-injection logic to reduce the latency of touch-point tracking, and to enable more precise positioning of the touch point.

SUMMARY

This disclosure provides, in one embodiment, a touch-sensing system comprising an active stylus including a probe electrode and associated sensory logic. The sensory logic is configured to receive a synchronization pulse sequence via the probe electrode between consecutive touch-sensing frames of a capacitive touch screen, to use the synchronization pulse sequence to synchronize a local row counter of the sensory logic to a remote row counter of the capacitive touch screen, to receive an excitation pulse via the probe electrode within a given touch-sensing frame, and to use the excitation pulse to maintain synchronization between the local row counter and the remote row counter.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that remedy the disadvantages noted in this disclosure.

DETAILED DESCRIPTION

Aspects of this disclosure will now be described with reference to the drawings listed above. Components, process steps, and other elements that may be substantially the same are identified coordinately and are described with minimal repetition. It will be noted, however, that elements identified coordinately may also differ to some degree. It will be further noted that the drawings are schematic and generally not drawn to scale. Rather, the various drawing scales, aspect ratios, and numbers of components shown may be purposely distorted to make certain features or relationships easier to see.

Figure 1:
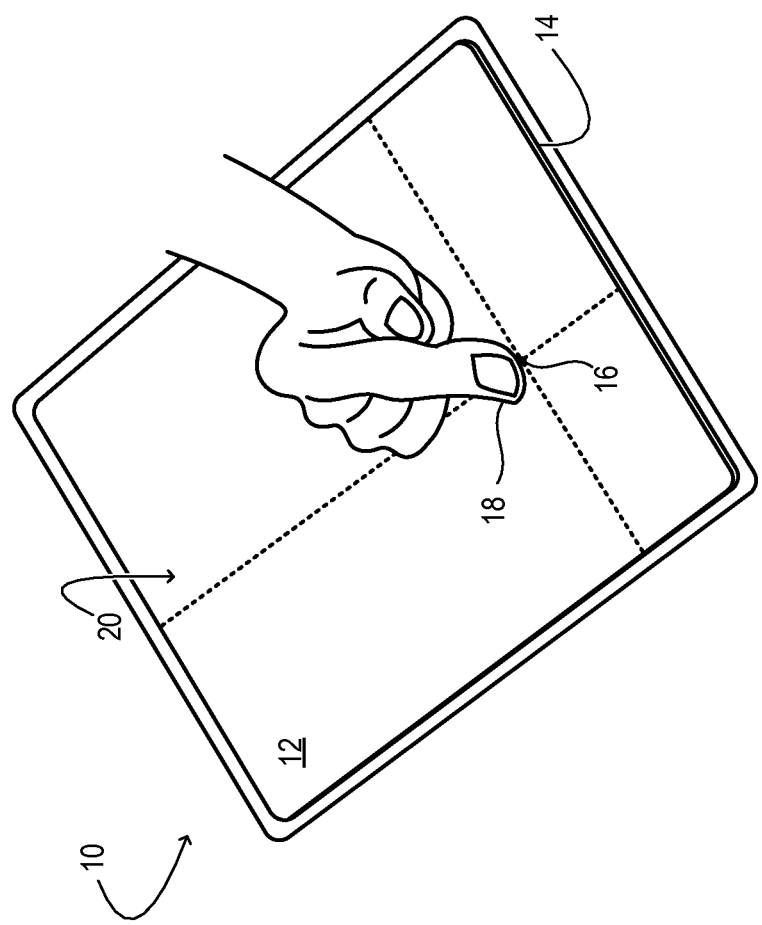
FIG. 1 shows aspects of an example touch-sensing system.

FIG. 1 shows aspects of an example touch-sensing system 10 including a capacitive touch screen 12. In the illustrated embodiment, the touch screen 12 is arranged on top of a liquid crystal display 14. In other embodiments, the touch screen may be arranged on top of a light-emitting diode (LED) display, an organic LED (OLED) display, a scanned-beam display, or any other kind of display. In still other embodiments, the touch screen may not be coupled to a display of any kind. It may be configured as a touch pad, usable in lieu of a computer mouse, for example.

Figure 2:
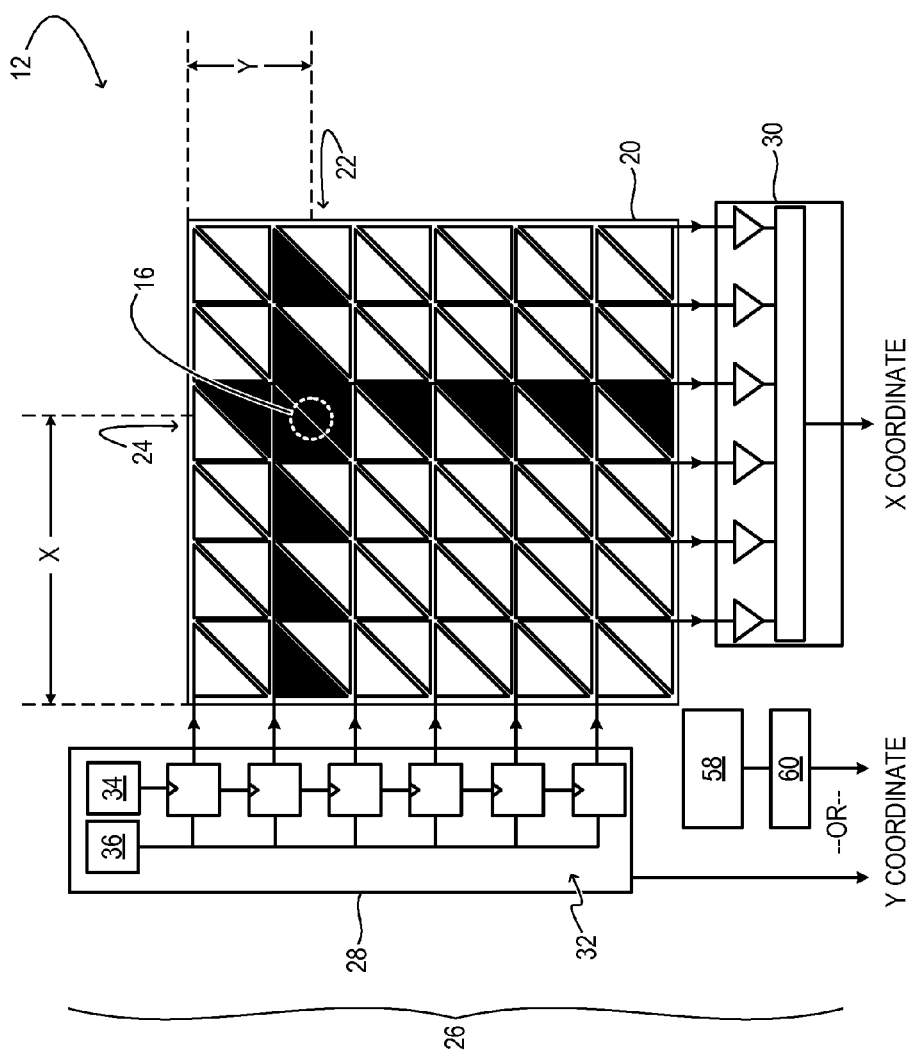
FIG. 2 shows aspects of an example capacitive touch screen of the touch-sensing system of FIG. 1.

Touch screen 12 is configured to sense one or more touch points 16 effected by a user. One example touch point is the point of contact between the user's fingertip 18 and the sensory surface 20 of the touch screen. FIG. 2 shows additional aspects of the touch screen in one, example embodiment. Arranged on sensory surface 20 is a series of row electrodes 22 and a series of column electrodes 24. Touch screens here contemplated may include any number N of row electrodes 22 and any number M of column electrodes. Further, although it is customary to have the row electrodes 22 aligned horizontally and the column electrodes 24 aligned vertically, this aspect is in no way necessary: indeed, the terms 'row' and 'column' may be exchanged everywhere in this description. Continuing, the row and column electrodes of touch screen 12 are addressed by touch-screen logic 26. Touch-screen logic 26 includes row-driver logic 28, column-sense logic 30, and other componentry to be described hereinafter.

Column-sense logic 30 includes M column amplifiers, each coupled to a corresponding column electrode 24. Row-driver logic 28 includes a row counter 32 in the form of an N-bit shift register with outputs driving each of N row electrodes 22. The row counter is clocked by row-driver clock 34. The row counter includes a blanking input to temporarily force all output values to zero independent of the values stored. Excitation of one or many rows may be provided by filling the row counter with ones at every output to be excited, and zeroes elsewhere, and then toggling the blanking signal with the desired modulation from modulation clock 36. In the illustrated embodiment, the output voltage may take on only two values, corresponding to the one or zero held in each bit of the row counter; in other embodiments, the output voltage may take on a greater range of values, to reduce the harmonic content of the output waveforms, or to decrease radiated emissions, for example.

The description above of row counter 32 should not be construed as limiting in any way, for numerous alternative implementations are equally contemplated. For instance, the row counter may be implemented as a micro-coded state machine within a field-programmable gated array (FPGA) of touch-screen logic 28. In other embodiments, the row counter may be embodied as a register within a microprocessor of the touch-screen logic, or as a data structure held in computer memory associated with the microprocessor. In these and other embodiments, the row counter may take on non-negative integer values—e.g., 0, 1, . . . N.

Row-driver logic 28 applies an excitation pulse to each row electrode 22 in sequence. During a period in which sensory surface 20 is untouched, none of the column amplifiers registers an above-threshold output. However, when the user places a fingertip on the sensory surface, the fingertip capacitively couples one or more row electrodes 22 intersecting the touch point 16 to one or more column electrodes 24 also intersecting the touch point. The capacitive coupling induces an above-threshold signal from the column amplifiers associated with the column electrodes beneath (i.e., adjacent) the touch point, which provides sensing of the touch point. Column-sense logic 30 returns, as the X coordinate of the touch point, the numeric value of the column providing the greatest signal. The touch-screen logic also determines which row was being excited when the greatest signal was received, and returns the numeric value of that row as the Y coordinate of the touch point. In one embodiment, touch-screen logic 26 may be implemented as a micro-coded state machine within an FPGA.

Figure 3:
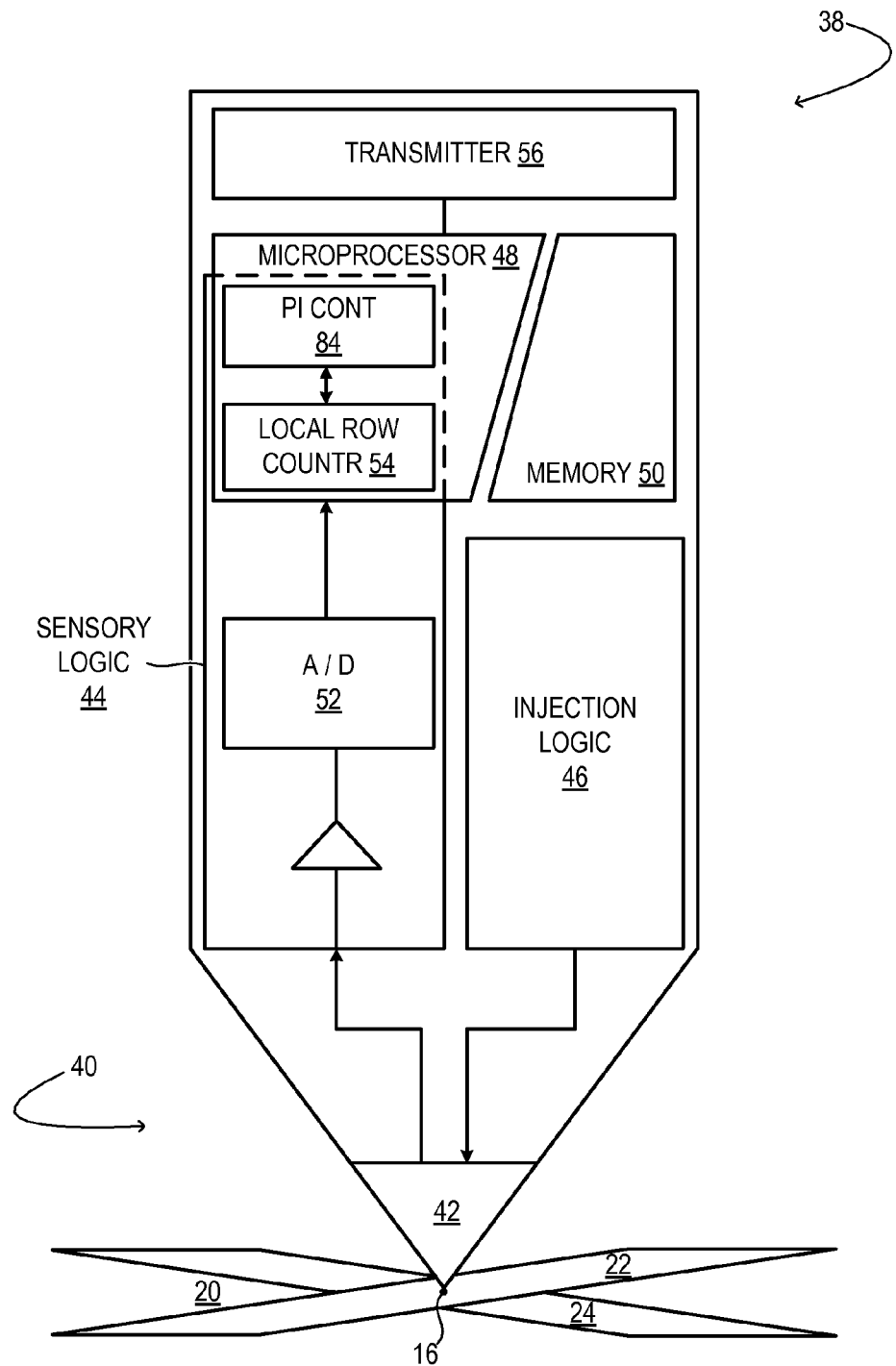
FIG. 3 shows aspects of an example active stylus of the touch-sensing system of FIG. 1.

In some examples, a passive stylus having a tip of relatively high dielectric-constant material may be used in lieu of the user's fingertip to capacitively couple row and column electrodes under the touch point. A passive stylus may provide better touch accuracy than the fingertip, and may prevent smudging of the display by the fingertip. Instead of a passive stylus, however, illustrated touch-sensing system 10 includes an active stylus 38, as shown in FIG. 3 in one example embodiment.

Active stylus 38 provides advantages over and beyond those of a passive stylus. For instance, the tip portion 40 of the active stylus may be small in comparison to a fingertip. The smaller size of the tip portion allows the user to more precisely position the touch point on the touch screen. Moreover, the active stylus supports a faster and more accurate mode of touch sensing, as further described below.

Active stylus 38 includes a probe electrode 42 at tip portion 40. The probe electrode is operatively coupled to associated sensory logic 44 and injection logic 46. The sensory and injection logic are operatively coupled to, and may be embodied partially within, microprocessor 48. Configured for digital signal processing (DSP), the microprocessor 48 is operatively coupled to associated computer memory 50, as described further below. Sensory logic 44 includes linear analog componentry configured to maintain the probe electrode 42 at a constant voltage and convert any current into or out of the probe electrode 42 into a proportional current-sense voltage. The sensory logic 44 includes an analog-to-digital (A/D) converter 52 that converts the current-sense voltage into digital data to facilitate subsequent processing. In one embodiment, the current-sense voltage may have bandwidth of approximately 100 kHz, and may be A/D-converted at a sampling rate of 1 million bits per second (Mbit/s).

Instead of capacitively coupling row and column electrodes of touch screen 12 via a dielectric, sensory logic 44 of active stylus 38 senses the arrival of an excitation pulse from row electrode 22, beneath (i.e., adjacent) touch point 16, and in response, injects charge into column electrode 24, also beneath the touch point 16. To this end, the active stylus 38 includes injection logic 46 associated with the probe electrode 42 and configured to control charge injection from the probe electrode 42 to the column electrode directly beneath (i.e., adjacent) the probe electrode. The injected charge appears, to column-sense logic 30 of the touch screen, identical to an electrostatic pulse delivered via capacitive coupling of the column electrode 24 to an energized row electrode 22 intersecting at the touch point 16.

In some embodiments, sensory logic 44 and injection logic 46 are active during non-overlapping time windows of each touch-sensing frame, so that charge injection and charge sensing may be enacted at the same probe electrode 42. In this embodiment, touch-screen logic 26 excites the series of row electrodes 22 during the time window in which the sensory logic is active, but suspends row excitation during the time window in which the active stylus 38 may inject charge. This strategy provides an additional advantage, in that it enables touch-screen logic 26 to distinguish touch points effected by active stylus 38 from touch points effected by a fingertip. If column-sense logic 30 detects charge from a column electrode 24 during the charge-injection time window of the active stylus 38 (when none of the row electrodes 22 are excited), then the touch point 16 detected must be a touch point 16 of the active stylus 38. However, if the column-sense logic detects charge during the charge-sensing window of the active stylus 38 (when row electrodes 22 are being excited), then the touch point 16 detected may be a touch point 16 of a fingertip, hand, or passive stylus, for example.

Active sensing followed by charge injection enables a touch point 16 of a very small area to be located precisely, without requiring long integration times that would increase the latency of touch sensing. For example, when receiving the signal from row electrode 22, the active stylus 38 may inject a charge pulse with amplitude proportional to the received signal strength. Thus, the touch sensor 26 may receive the electrostatic signal from the active stylus 38 and calculate the Y coordinate, which may be the row providing the greatest signal from the active stylus 38, or a function of the signals received at that row and adjacent rows. Nevertheless, this approach introduces various challenges. The major challenge is that the sensory logic 44 and injection logic 46 may work simultaneously. Thus, probe electrode 42 may work in full-duplex mode. Various methods, for example code division or frequency division multiple access, may be applied to cancel the strong interference at the receiving direction from the transmitting direction. The touch sensor 26 may be required to receive two signals simultaneously (one from the row electrode 22, and the other from the stylus probe electrode 42). The system may also work by time-division, but at a cost in available integration time.

One solution to this problem requires active stylus 38 to assume a more active role in determining the touch point coordinates. In the illustrated embodiment, sensory logic 44 of the active stylus 38 includes a local row counter 54, which is maintained in synchronization with row counter 32 (hereinafter, the remote row counter) of touch-screen logic 26. This feature gives the active stylus 38 and touch screen 12 a shared sense of time without being wired together. In some embodiments, the local row counter 54 may be embodied as discrete hardware—e.g., a clocked register having a series of interconnected flip flops as described above. In other embodiments, the local row counter 54 may be embodied as a register within microprocessor 48 of the touch-screen logic, or as a data structure held in computer memory 50 associated with the microprocessor 48.

When probe electrode 42 touches sensory surface 20 of the touch screen 12, sensory logic 44 receives a waveform that lasts as long as the touch is maintained. The waveform acquires maximum amplitude at the moment in time when row electrode 22, directly beneath (i.e., adjacent) the probe electrode 42, has been energized. Sensory logic 44 is configured to sample the waveform at each increment of the local row counter 54 and determine when the maximum amplitude was sensed. This determination can be made once per frame, for example.

Because active stylus 38 and touch screen 12 enjoy a shared sense of timing (having synchronized row counters 32), the local row-counter 54 state at maximum sensed amplitude reports directly on the row coordinate—i.e., the Y coordinate—of touch point 16. In order to make use of this information, the Y coordinate must be communicated back to touch-screen logic 26. To this end, the active stylus 38 includes communication componentry configured to wirelessly communicate the computed row coordinate to row-sense logic of the touch screen 12. This disclosure embraces various modes of communicating data, including the Y coordinate, from active stylus 38 to touch screen 12. The particular mode being implemented may differ in the different embodiments of this disclosure.

In one embodiment, the Y coordinate may be communicated electrostatically, via injection logic 46 of the active stylus 38 (the communication componentry in one, non-limiting embodiment), using a coding and modulation scheme that permits information to be exchanged robustly between the active stylus 38 and the touch screen 12. For instance, an FEC (forward error correction) coding scheme may be applied on the Y coordinate bits, where that coordinate is represented as a binary fixed-point value. Then, the coded Y coordinate may be used to modulate the charge pulse, for example with a BPSK or PPM (pulse-position modulation) scheme. The modulated charge pulse may be injected by probe electrode 42 into the underlying column electrode 24 within a specific time window.

In another embodiment, the Y coordinate may be communicated from active stylus 38 to touch screen 12 over a wireless communication link. Wireless communication links suitable for this purpose include infrared and radio links—e.g., Bluetooth, Wi-Fi, dedicated AM, FM, UHF, and the like. Accordingly, active stylus 38 of FIG. 3 includes a wireless transmitter 56 as communication componentry; touch screen 12 of FIG. 2 includes a complementary wireless receiver 58. Microprocessor 48 of the active stylus 38 may be configured to encode the Y coordinate in a manner suitable for transmission via the wireless transmitter 56. Likewise, demodulated signal from the wireless receiver 58 may be processed in active-stylus decoder 60 of touch-screen logic 26 to reveal the Y coordinate of touch point 16.

As described above, the operation of active stylus 38 in conjunction with touch screen 12 relies on accurate synchronization between the local row counter 54 of the active stylus 38 and the remote row counter 32 of the touch screen 12. To this end, row-driver logic 28 is configured to provide a synchronization pulse sequence between consecutive touch-sensing frames of the capacitive touch screen—e.g., at the start of every touch-sensing frame. The synchronization pulse sequence is applied to many row electrodes 22 distributed along sensory surface 20 and energized concurrently—every third row, every fourth row, etc.—so that the active stylus 38 can detect the synchronization pulse from any position on the touch screen 12. Sensory logic 44 is configured to receive the synchronization pulse sequence via probe electrode 42 and to use the synchronization pulse sequence to synchronize local row counter 54 of the sensory logic 44 with the remote row counter 32 of the capacitive touch screen. For example, the sensory logic 44, on recognizing the synchronization pulse sequence, may reset local row counter 54 so that the local row counter 54 remains synchronized to remote row counter 32 through the subsequent frame. Following the synchronization pulse sequence, row-driver logic 28 may transmit one or more bits of header information, using a modulation scheme that permits information to be exchanged between the active stylus 38 and touch screen 12. Then, row-driver logic 28 starts exciting each row electrode 22 in sequence.

Figure 4:
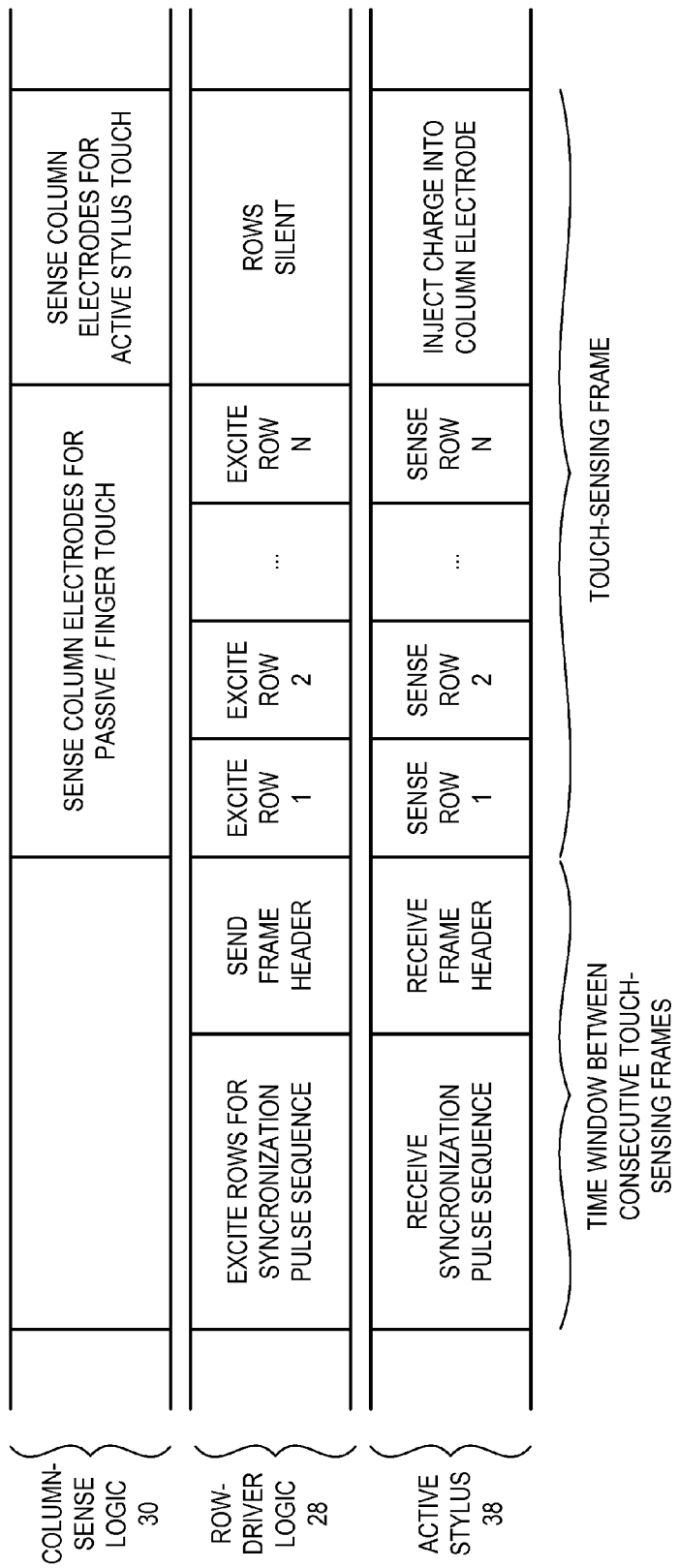
FIG. 4 illustrates an example shared timing scheme between an active stylus and capacitive touch screen of a touch-sensing system.

FIG. 4 illustrates an example shared timing scheme for touch-sensing system 10 in one example embodiment. In the illustrated scheme shows one touch-sensing frame in which touch points 16 are sensed. The touch-sensing frame may be repeated indefinitely over time, with a dedicated time window separating consecutive touch-sensing frames; this is the time window in which the synchronization pulse sequence and header information are exchanged between the touch screen 12 and the active stylus 38.

Figure 5:
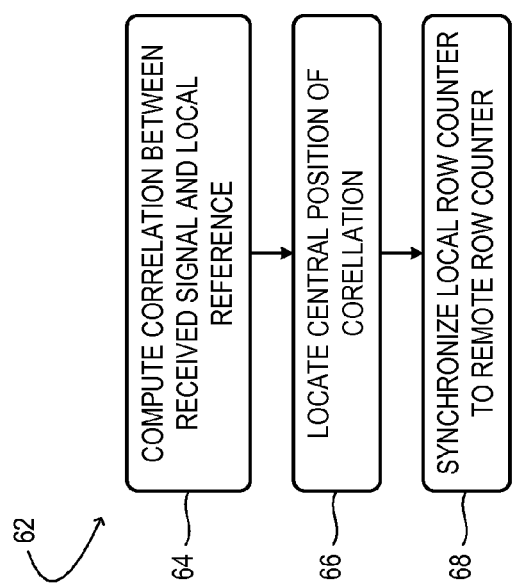
FIG. 5 illustrates an example method to synchronize a local row counter of an active stylus to a remote row counter of a capacitive touch screen based on a synchronization pulse sequence applied by the capacitive touch screen between touch-sensing frames.

Various methods may be used to synchronize local row counter 54 to remote row counter 32 of touch screen 12, based on a synchronization pulse sequence applied between touch-sensing frames to a plurality of row electrodes 22 distributed along the touch screen 12. FIG. 5 illustrates an example method 62 to provide the initial synchronization.

Figure 6:
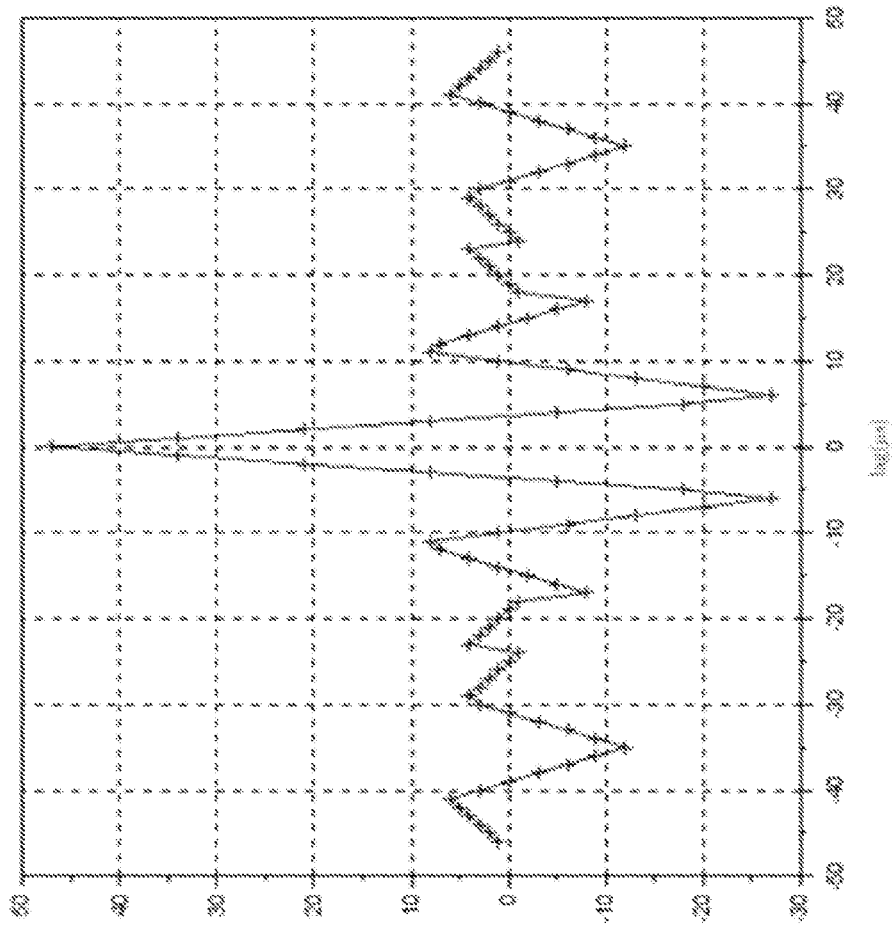
FIG. 6 is a graph showing an autocorrelation function of an example synchronization pulse sequence from a capacitive touch screen.

At 64 of method 62, sensory logic 44 computes a correlation between the electrostatic signal r_s(t) associated with the synchronization pulse sequence received at probe electrode 42 and a local reference ref_s(t). The local reference may be a clean facsimile of the synchronization pulse sequence sent by touch screen 12. The graph of FIG. 6 shows the autocorrelation function of an example synchronization pulse sequence. In one example, $$\mathrm{corr\_g}(k) := \mathrm{correlation}(r\_s(t+k*t\_s), \mathrm{ref\_s}(t)),$$

where t_s is the sampling interval. The value of t_s may be 1 microsecond (μs) in one embodiment.

At 66 of method 62, a suitable central position of the correlation is located. In one embodiment, the central position corresponds to the maximum value of corr_g(k). In other words, $$\mathrm{corr\_g}(m) == \max(\{\mathrm{corr\_g}(k)| \text{ for all } k\}).$$

In another embodiment, the sensory logic may be configured to identify a first occurrence of an above-threshold position in the correlation. Thus, the located central position m may be the first position which is above the threshold. This variant may be appropriate if the received signal is gain controlled (e.g., with automatic gain control (AGC)). In this example, $$m := \min(\{k| \mathrm{corr\_g}(k) > \mathrm{corr\_threshold}\}).$$

At 68 of method 62, the sensory logic 44 synchronizes local row counter 54 to remote row counter 32 of the capacitive touch screen 12, based on the correlation. To synchronize robustly, the synchronization pulse sequence should have a desirable autocorrelation property; that is, the peak side-lobe level ratio (PSLR) of its autocorrelation should be small. In some implementations, only the positive (>0) portion of the autocorrelation is relevant—e.g., $$PSLR = 20*\log 10(\text{peak sidelobe}/\text{corr\_g}(0)) = 20*\log 10(8/47) \approx -15.38 \text{ dB}.$$

Figure 7:
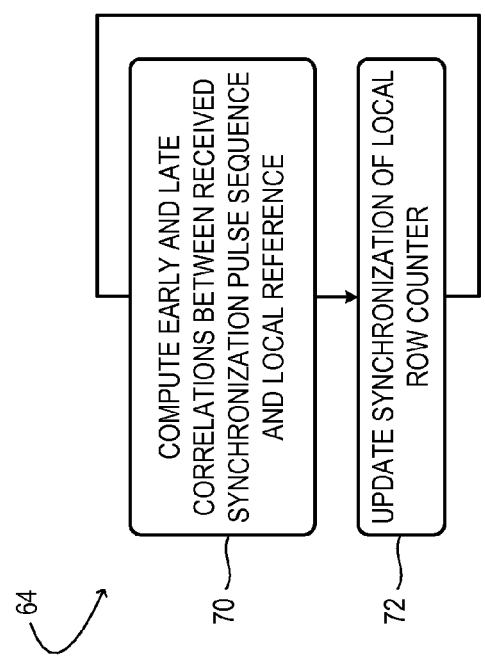
FIG. 7 illustrates an example method to maintain synchronization between a local row counter of an active stylus and a remote row counter of a capacitive touch screen based on a synchronization pulse sequence applied by the capacitive touch screen between touch-sensing frames.

Once initial synchronization is obtained, microprocessor 48 may continue tracking the offset between row counter 32 of touch screen 12 and local row counter 54 via the synchronization pulse sequence. An example method for continued tracking is illustrated in FIG. 7. In this method, early and late correlations between the received synchronization pulse sequence and the local reference are computed, at 70, in order to maintain synchronization between the local row counter 54 and the remote row counter 32.

Figure 8:
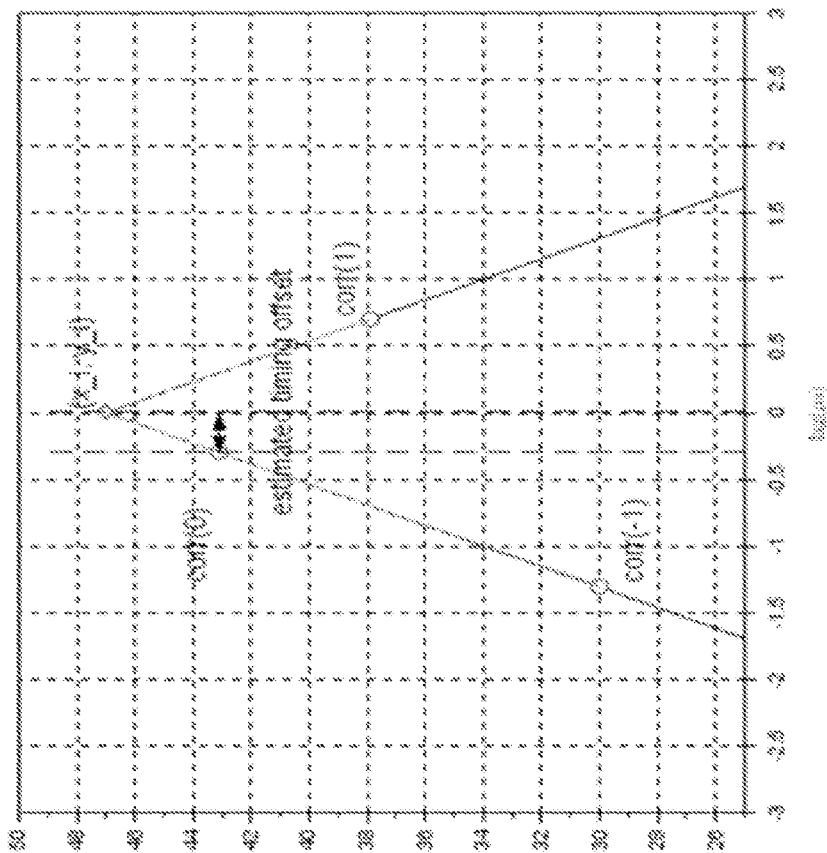
FIGS. 8 and 9 are graphs showing correlation of a synchronization pulse sequence from a capacitive touch screen against a local facsimile of the synchronization pulse sequence under differing conditions.
Figure 9:
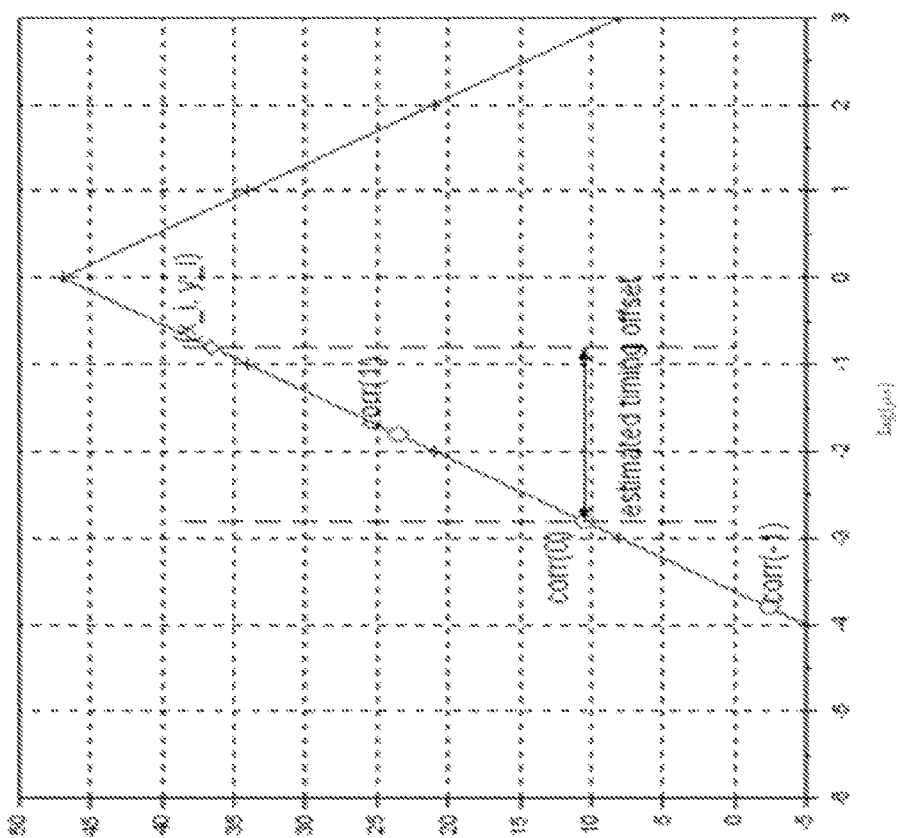

The graph of FIG. 8 shows the correlation of an example synchronization pulse sequence against a local reference when the actual timing lag is within a [−0.5 µs, 0.5 µs] interval. The graph of FIG. 9 shows the correlation when the actual timing lag is within a [−3 µs, −2 µs] interval.

At 72, the synchronization of the local row counter 54 to the remote row counter 32 is updated (vide infra). The method of FIG. 7 may be used by itself, in certain scenarios. However, it is particularly useful for refining the synchronization after the method of FIG. 5 has initially been executed. The extended domain of the correlation in the method of FIG. 5 immunizes it against false correlations in which the series of peaks in the received synchronization pulse sequence is locked to an offset series of peaks of the local reference, which may occur on boot up or after an extended idle period, for example. On the other hand, the abbreviated domain in the method of FIG. 7 avoids unnecessarily repeating an extended correlation which is still largely valid, but may have shifted out of phase by less than one period.

Figure 10:
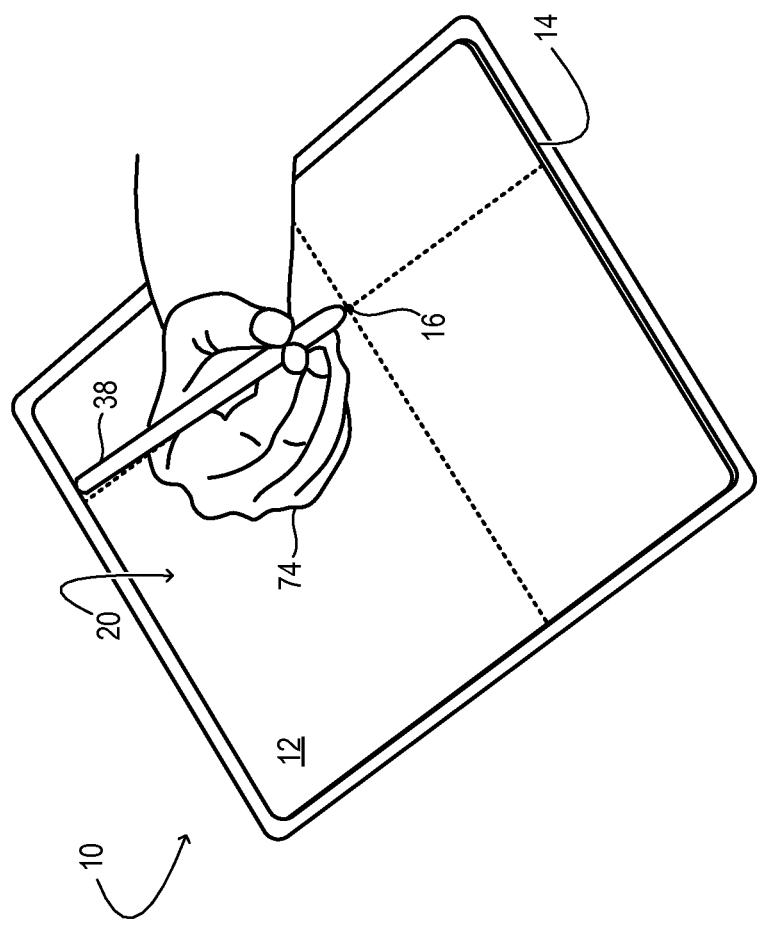
FIG. 10 shows additional aspects of the touch-sensing system of FIG. 1.

Despite the advantages of correlation-based synchronization as described above, this approach may be unreliable in certain, non-ideal use scenarios. One such scenario is illustrated in FIG. 10. In particular, synchronization using the above methods may fail if a portion of the user's hand 74 that holds active stylus 38 is resting on the sensory surface 20 of touch screen 12 during the synchronization pulse sequence. Excessive capacitive coupling between the touch screen 12 and the active stylus 38 through the hand may attenuate and/or phase shift the synchronization pulse sequence as received by probe electrode 42. This problem is better appreciated in view of the following analysis, where Cts is the capacitance from the probe electrode 42 to the row electrodes 22 driven with the synchronization pulse sequence, Ctg is the capacitance from the probe electrode 42 to display chassis ground or equivalent (e.g., column electrodes 24 or inactive row electrodes 22), Cbs is the capacitance from the user's body to the row electrodes 22 driven with the synchronization pulse, and Cbg is the capacitance from the user's body to the display chassis ground or equivalent.

If Cts/(Cts+Ctg)>>Cbs/(Cbs+Cbg), then current due to the synchronization pulse sequence will flow into probe electrode 42. If Cts/(Cts+Ctg)≈Cbs/(Cbs+Cbg), then approximately zero current due to the synchronization pulse sequence will flow into the probe electrode 42. If Cts/(Cts+Ctg)<<Cbs/(Cbs+Cbg), then current due to the synchronization pulse sequence will flow out of the probe electrode 42—so the synchronization pulse sequence will be received, but with opposite phase.

During the first condition above, active stylus 38 works as expected. During the second condition, synchronization between the active stylus 38 and the touch screen 12 is lost. During the third condition, the active stylus 38 receives the synchronization pulse sequence, but the phase is wrong. Accordingly, an active stylus 38 maintaining synchronization via the synchronization pulse sequence only may lose synchronization when the user places his palm on sensory surface 20.

To address the above issue and provide still other advantages, this disclosure offers a supplementary mode of synchronization, which is reliable even when the synchronization pulse sequence is poorly received because of capacitive coupling through the user's hand. In this approach, the sequential excitation pulses provided to each row electrode 22 of sensory surface 20 during each touch-sensing frame, and received by probe electrode 42, are used to maintain synchronization of local row counter 54 to remote row counter 32 of touch-screen logic 26. The sequential excitation pulses are less prone to attenuation and phase shift from coupling through the user's hand, because the row electrodes 22 are energized individually (i.e., one row at a time), according to the row-excitation sequence.

Figure 11:
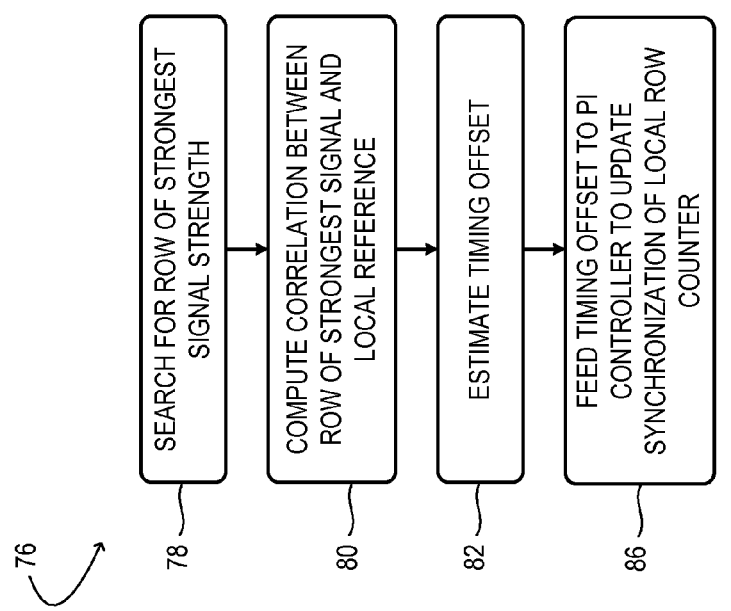
FIG. 11 illustrates an example method to synchronize a local row counter of an active stylus to a remote row counter of a capacitive touch screen based on a sequence of row excitation pulses applied by the capacitive touch screen during a touch-sensing frame.

FIG. 11 illustrates an example method 76 to maintain the synchronization of local row counter 54 of active stylus 38 to remote row counter 32 of touch screen 12 based on row excitation pulses applied during a touch-sensing frame. One or many excitation pulses may be used for each frame to maintain the synchronization.

Figure 12:
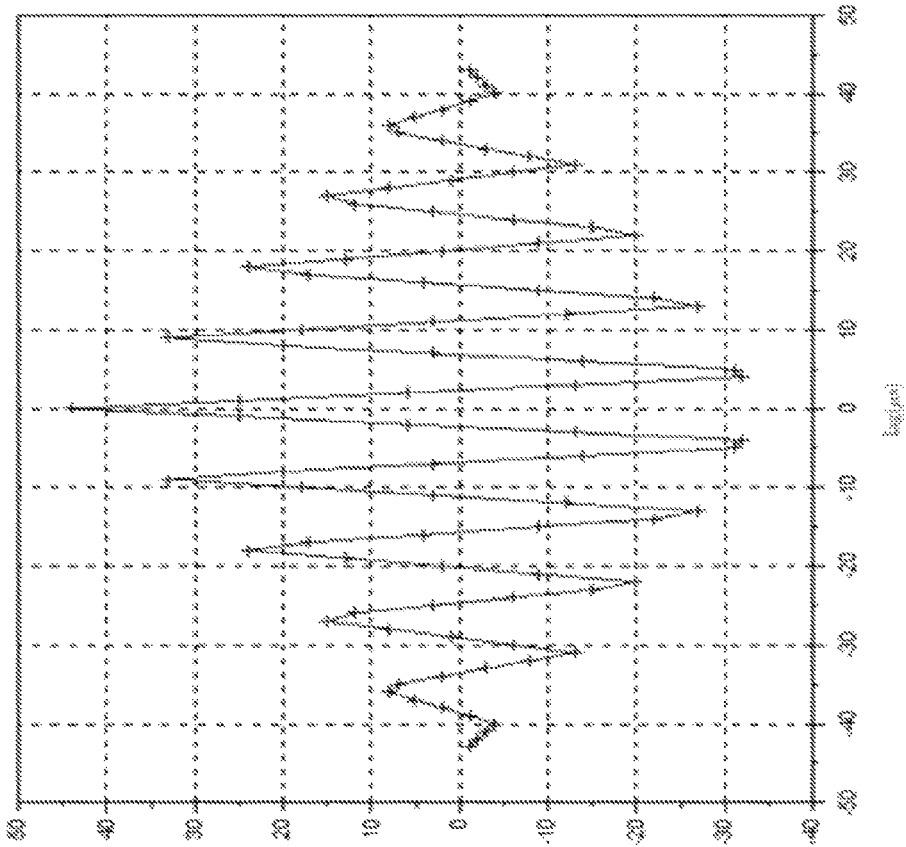
FIG. 12 is a graph showing an autocorrelation function of an example excitation pulse from a capacitive touch screen.

At 78 of method 76, the row excitation effecting the strongest signal from probe electrode 42 is searched for. This row is denoted r_e(t). At 80 the correlation between r_e(t) and a local reference ref_e(t) is computed. The local reference may be a clean facsimile of the excitation pulse sent by the touch screen. The graph of FIG. 12 shows the autocorrelation function of an example excitation pulse or local reference. In one example, $$\text{corr}(k):=\text{correlation}(r\_e(t+k*t\_s), \text{ref}\_e(t)).$$

Once the correlations are computed, an interpolation algorithm is applied, at 82, to estimate the timing offset between row counter 32 of touch-screen logic 26 and the local row counter 54 of active stylus 38. In one implementation, corr(k), k=[−1, 0, 1] may be used to estimate the timing offset. The autocorrelation of the synchronization pulse sequence goes (roughly linearly) from −27 to +47 over a 6*t_s interval, for a zero-crossing around 3.5*t_s. Further, the autocorrelation of the excitation pulse goes (roughly linearly) from −32 to +44 over a 4*t_s interval, providing a zero-crossing around 2.3*t_s. Accordingly, the tracking range of the timing offset based on excitation pulses is slightly smaller than the tracking range based on the synchronization pulse sequence described hereinabove. In practice, however, it is observed that the timing offset stays within a range of [−0.5*t_s, 0.5*t_s] most of the time.

In some embodiments, the interpolation algorithm is configured to have roughly the same symmetry properties as the underlying autocorrelation function. For instance, the interpolation algorithm may be chosen to be antisymmetric on interchange of early and late correlations equidistant from a contemporaneous (k=0) correlation. In other words, on interchange of the early (corr(−1)) and late (corr(1)) correlations, the estimated timing offset should be negated. Accordingly, one example interpolation algorithm includes, if corr(−1)>corr(1), interchanging corr(−1) and corr(1) and setting an associated isNegated flag. When the timing offset is within [−0.5*t_s, 0.5*t_s], corr(0)>corr(−1) and corr(0)>corr(1). In this case, linear interpolation may be used to estimate the timing offset.

The line formed by [−1, corr(−1)] and [0, corr(0)] may be written as:

$$y = a*x + b\_1,$$

where a is the slope and b_1 is the y-intercept. Thus, $$\text{corr}(-1) = -a + b\_1, \text{ and}$$

$$\text{corr}(0) = b\_1.$$

Therefore, $$a = \text{corr}(0) - \text{corr}(-1).$$

Since the autocorrelation function is antisymmetric, [1, corr(1)] lies on the line:

$$y = -a*x + b\_2,$$

where b_2 is the y-intercept, and $$\text{corr}(1) = -a + b\_2.$$

Thus, the x, y coordinates of the intersection of the two lines, y=a*x+b_1 and y=−a*x+b_2) may be written as:

$$x\_i = (\text{corr}(1) - \text{corr}(0) + a)/2a,$$

$$y\_i = a*x\_i + \text{corr}(0).$$

If the isNegated flag is set, then $$x\_i = -x\_i.$$

The estimated timing offset is now given by e(t)=x_i.

Figure 13:
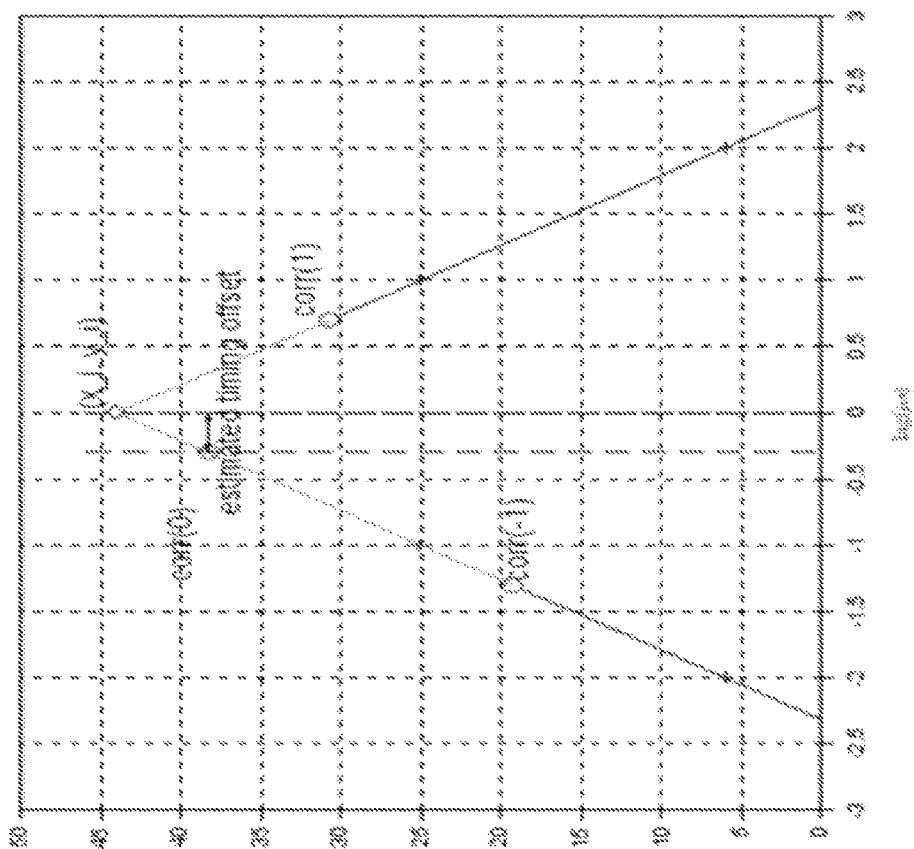
FIGS. 13 and 14 are graphs showing correlation of an excitation pulse from a capacitive touch screen against a local facsimile of the excitation pulse under differing conditions.
Figure 14:
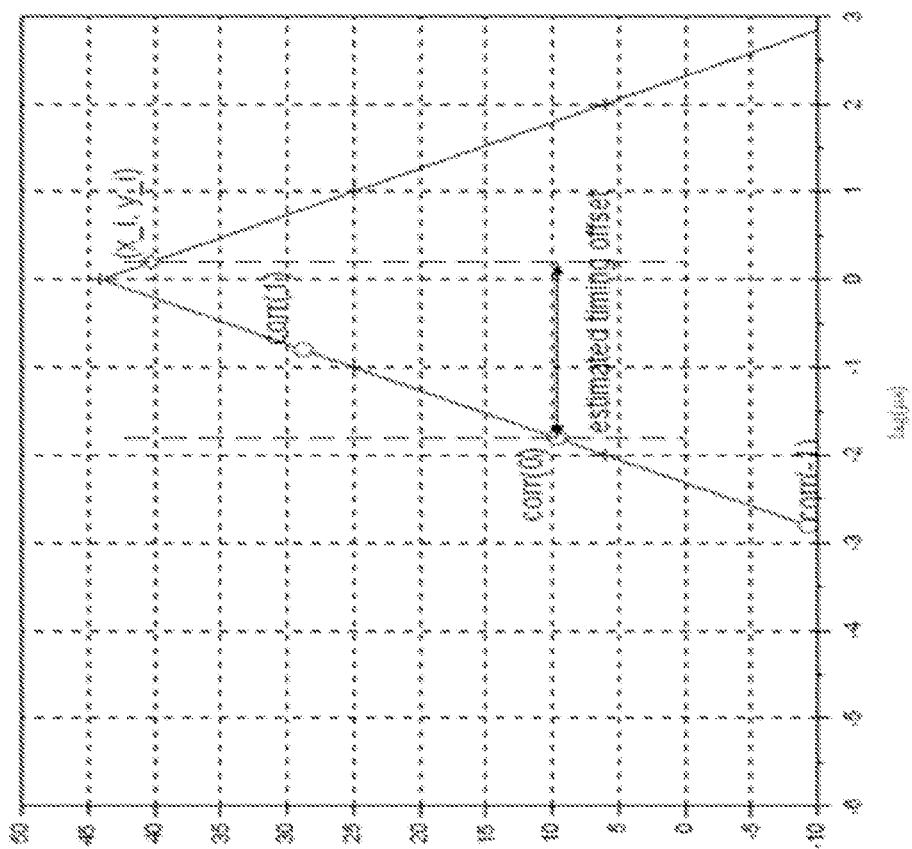

In some embodiments, the interpolation algorithm is chosen to be insensitive to the received signal strength. Therefore, if the timing offset is beyond the [−0.5*t_s, 0.5*t_s] interval, for example, corr(−1)<corr(0)<corr(1), then the sign of the computed correlations may be used to estimate the timing offset. For example, if corr(−1)<corr(0)<0, and corr(1)>0, since a zero-crossing of the autocorrelation of the excitation pulse is around 2.3*t_s, the timing offset may be located in [2.3*t_s, 3.3*t_s]. If it is assumed that the timing offset has a uniform distribution within this range, then the expected timing offset (e(t)) may be expressed as (2.3+3.3)/2=2.8*t_s. The algorithm proceeds similarly for the other distributions and all other cases. The graph of FIG. 13 shows an example correlation of an excitation pulse against a local reference when the actual timing lag is within a [−0.5 μs, 0.5 μs] interval. The graph of FIG. 14 shows an example correlation when the actual timing lag is within a [−2 μs, −1 μs] interval.

Returning briefly to FIG. 3, sensory logic 44 may include a proportional-integral (PI) controller 84 which may influence various timing parameters of active stylus 38. In the illustrated embodiment, the sensory logic 44 is configured to feed the estimated timing offset into the PI controller, at 86 of FIG. 11, for synchronization calibration and tracking. In one example implementation:

$$u(t) = Kp*e(t) + l(t),$$

$$l(t) = l(t - t\_s) + Ki*e(t),$$

where l(t) is an integral component. The sum u(t) of the proportional and integral components may influence the timing in various ways, depending on the embodiment. For example, the sum may be used to offset a frequency of a local clock in the active stylus 38. If local row counter 54 lags behind remote row counter 32 of touch screen 12, the clock frequency may be increased to reduce the lag. Or, if the local row counter 54 is ahead of the remote row counter 32, the frequency may be decreased. In these and other embodiments, an offset based on the PI controller output may be applied to the value held in the local row counter 54, to synchronize the two counters.

Although the foregoing description has emphasized synchronization of a row counter 54 local to active stylus 38 to a remote row counter 32 of touch screen 12, the synchronization approaches described above may have the more general effect of enforcing a shared timing scheme between the active stylus 38 and the touch screen 12, such as the shared timing scheme illustrated in FIG. 4. In other words, row-counter synchronization may be one aspect of a more general synchronization scheme that includes synchronization of various time windows—column-sense windows for finger and active-stylus touch, a header window, and a window for sending and receiving a synchronization pulse sequence, for example.

It should be further noted that while the methods of FIGS. 5, 7, and 11 each include mathematical correlation of a received signal against a facsimile of that signal, even this aspect may differ in some embodiments. In lieu of the correlation in method 76, for example, analog edge detection and analysis may be used to quantify the amount of lag of a clock reference internal to the active stylus 38 with respect to an excitation pulse received from the touch screen 12. More generally, this disclosure embraces any approach in which an excitation pulse received within a given touch-sensing frame is used to maintain synchronization between the local row counter 54 and the remote row counter 32.

As evident from the foregoing description, the methods and processes described herein may be tied to a compute system of one or more computing machines—e.g., the logical constructs of touch screen 12 and active stylus 38. Such methods and processes may be implemented as a hardware driver program or service, an application-programming interface (API), a library, and/or other computer-program product. Each computing machine includes a logic machine, an associated computer-memory machine, and a communication machine. These machines are embodied as microprocessor 48, computer memory 50, and radio transmitter 56 in the active stylus of FIG. 3. Analogous, complementary machines are embodied in touch-screen logic 26 of FIG. 2.

Each logic machine includes one or more physical logic devices configured to execute instructions. A logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

A logic machine may include one or more processors configured to execute software instructions. Additionally or alternatively, a logic machine may include one or more hardware or firmware logic machines configured to execute hardware or firmware instructions. Processors of a logic machine may be single-core or multi-core, and the instructions executed thereon may be configured for sequential, parallel, and/or distributed processing. Individual components of a logic machine optionally may be distributed among two or more separate devices, which may be remotely located and/or configured for coordinated processing. Aspects of a logic machine may be virtualized and executed by remotely accessible, networked computing devices configured in a cloud-computing configuration.

Each computer-memory machine includes one or more physical, computer-memory devices configured to hold instructions executable by an associated logic machine to implement the methods and processes described herein. When such methods and processes are implemented, the state of the computer-memory machine may be transformed—e.g., to hold different data. A computer-memory machine may include removable and/or built-in devices; it may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. A computer-memory machine may include volatile, nonvolatile, dynamic, static, read/write, read-only, random-access, sequential-access, location-addressable, file-addressable, and/or content-addressable devices.

It will be appreciated that a computer-memory machine includes one or more physical devices. However, aspects of the instructions described herein alternatively may be propagated by a communication medium (e.g., an electromagnetic signal, an optical signal, etc.), as opposed to being stored via a storage medium.

Aspects of a logic machine and associated computer-memory machine may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms 'module', 'program', and 'engine' may be used to describe an aspect of a computer system implemented to perform a particular function. In some cases, a module, program, or engine may be instantiated via a logic machine executing instructions held by a computer-memory machine. It will be understood that different modules, programs, and engines may be instantiated from the same application, service, code block, object, library, routine, API, function, etc. Likewise, the same module, program, or engine may be instantiated by different applications, services, code blocks, objects, routines, APIs, functions, etc. A module, program, or engine may encompass individual or groups of executable files, data files, libraries, drivers, scripts, database records, etc.

A communication machine may be configured to communicatively couple the compute system to one or more other machines, including server computer systems. The communication machine may include wired and/or wireless communication devices compatible with one or more different communication protocols. As non-limiting examples, a communication machine may be configured for communication via a wireless telephone network, or a wired or wireless local- or wide-area network. In some examples, a communication machine may allow a computing machine to send and/or receive messages to and/or from other devices via a network such as the Internet.

It will be understood that the configurations and/or approaches described herein are exemplary in nature, and that these specific examples or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

One aspect of this disclosure is directed to a touch-sensing system comprising an active stylus including a probe electrode and associated sensory logic. The sensory logic is configured to receive a synchronization pulse sequence via the probe electrode between consecutive touch-sensing frames of a capacitive touch screen; use the synchronization pulse sequence to synchronize a local row counter of the sensory logic to a remote row counter of the capacitive touch screen; receive an excitation pulse via the probe electrode within a given touch-sensing frame; and use the excitation pulse to maintain synchronization between the local row counter and the remote row counter.

In some implementations, the act of using the excitation pulse sequence includes computing a correlation between a strongest excitation pulse received and a facsimile of the excitation pulse. The sensory logic may be further configured to estimate a timing offset between the local row counter and the remote row counter. In these and other implementations, the sensory logic may be configured to apply an interpolation algorithm to estimate the timing offset. This interpolation algorithm may be antisymmetric on interchange of early and late correlations equidistant from a contemporaneous correlation, and/or insensitive to signal strength of the excitation pulse received. Further, the timing offset may be estimated based on a sign of a computed correlation. In some implementations, the sensory logic includes a proportional-integral (PI) controller, and the estimated timing offset is provided as input to the PI controller. In these and other implementations, the synchronization pulse sequence is received from a plurality of row electrodes distributed along a sensory surface of the touch screen and energized concurrently. The excitation pulse, by contrast, is received from a row electrode arranged on a sensory surface of the touch screen and energized individually, according to a row excitation sequence. In some implementations, the active stylus includes injection logic associated with the probe electrode and configured to control charge injection from the probe electrode to a column electrode of the touch screen arranged directly adjacent the probe electrode. In these and other implementations, the sensory logic may be further configured to compute a row coordinate adjacent the probe electrode. Accordingly, the active stylus may include communication componentry configured to wirelessly communicate the computed row coordinate to the touch screen. In some implementations, the communication component may be configured to communicate the computed row coordinate electrostatically, via injection logic of the active stylus. In other implementations, the communication component may include a radio transmitter configured to transmit the computed row coordinate; the touch screen may include a radio receiver configured to receive the computed row coordinate. In some implementations, the remote row counter is arranged in row-driver logic of the touch screen, and the row-driver logic is configured to energize each row electrode of the touch screen in sequence.

Another aspect of this disclosure is directed to a touch-sensing system comprising an active stylus including a probe electrode and associated sensory logic. The sensory logic is configured to receive a synchronization pulse sequence via the probe electrode between consecutive touch-sensing frames of a capacitive touch screen; compute a correlation between the synchronization pulse sequence received and a facsimile of the synchronization pulse sequence; and synchronize a local row counter of the sensory logic with a remote row counter of the capacitive touch screen based on the correlation.

In some implementations, the sensory logic is further configured to locate a position corresponding to a maximum value of the correlation. In other implementations, the sensory logic is further configured to identify a first occurrence of an above-threshold position in the correlation. In these and other implementations, the sensory logic may be further configured to compute early and late correlations between the synchronization pulse sequence received and the facsimile to maintain synchronization between the local row counter and the remote row counter.

Another aspect of this disclosure is directed to a touch-sensing system comprising an active stylus including a probe electrode and associated sensory logic. The sensory logic is configured to receive a synchronization pulse sequence via the probe electrode between consecutive touch-sensing frames of a capacitive touch screen; compute a synchronization pulse-sequence correlation between the synchronization pulse sequence received and a facsimile of the synchronization pulse sequence; synchronize a local row counter of the sensory logic to a remote row counter of the capacitive touch screen based on the synchronization pulse-sequence correlation; receive an excitation pulse via the probe electrode within a given touch-sensing frame; compute an excitation-pulse correlation between the excitation pulse received and a facsimile of the excitation pulse; and maintain synchronization between the local row counter and the remote row counter based on the excitation-pulse correlation.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A touch-sensing system comprising:
an active stylus including a probe electrode and associated sensory logic;
the sensory logic configured to:
receive a synchronization pulse sequence via the probe electrode between consecutive touch-sensing frames of a capacitive touch screen;
use the synchronization pulse sequence to synchronize a local row counter of the sensory logic to a remote row counter of the capacitive touch screen;
receive an excitation pulse via the probe electrode within a given touch-sensing frame; and
use the excitation pulse to maintain synchronization between the local row counter and the remote row counter, including computing a correlation between a strongest excitation pulse received and a facsimile of the excitation pulse.

2. The touch-sensing system of claim 1, wherein the sensory logic is further configured to estimate a timing offset between the local row counter and the remote row counter.

3. The touch-sensing system of claim 2, wherein the sensory logic is configured to apply an interpolation algorithm to estimate the timing offset.

4. The touch-sensing system of claim 3, wherein the interpolation algorithm is antisymmetric on interchange of early and late correlations equidistant from a contemporaneous correlation.

5. The touch-sensing system of claim 3, wherein the interpolation algorithm is insensitive to signal strength of the excitation pulse received.

6. The touch-sensing system of claim 5, wherein the timing offset is estimated based on a sign of the computed correlation.

7. The touch-sensing system of claim 5, wherein the sensory logic includes a proportional-integral (PI) controller, and wherein the estimated timing offset is provided as input to the PI controller.

8. The touch-sensing system of claim 1, wherein the synchronization pulse sequence is received from a plurality of row electrodes distributed along a sensory surface of the touch screen and energized concurrently.

9. The touch-sensing system of claim 1, wherein the excitation pulse is received from a row electrode arranged on a sensory surface of the touch screen and energized individually, according to a row excitation sequence.

10. The touch-sensing system of claim 1, wherein the active stylus includes injection logic configured to control charge injection from the probe electrode to a column electrode of the touch screen arranged directly adjacent the probe electrode.

11. The touch-sensing system of claim 1, wherein the sensory logic is further configured to compute a row coordinate adjacent the probe electrode, and wherein the active stylus includes communication componentry configured to wirelessly communicate the computed row coordinate to the touch screen.

12. The touch-sensing system of claim 11, wherein the communication component is configured to communicate the computed row coordinate electrostatically, via injection logic of the active stylus.

13. The touch-sensing system of claim 11, wherein the communication component includes a radio transmitter configured to transmit the computed row coordinate, and wherein the touch screen includes a radio receiver configured to receive the computed row coordinate.

14. The touch-sensing system of claim 1, wherein the remote row counter is arranged in row-driver logic of the touch screen, wherein the row-driver logic is configured to energize each row electrode of the touch screen in sequence.

15. A touch-sensing system comprising:
an active stylus including a probe electrode and associated sensory logic;
the sensory logic configured to:
receive a synchronization pulse sequence via the probe electrode between consecutive touch-sensing frames of a capacitive touch screen;
compute a synchronization-pulse correlation between the synchronization pulse sequence received and a facsimile of the synchronization pulse sequence;
synchronize a local row counter of the sensory logic with a remote row counter of the capacitive touch screen based on the synchronization pulse-sequence correlation, including locating a position corresponding to a maximum value of the synchronization-pulse correlation and/or identifying a first occurrence of an above-threshold position in the synchronization-pulse correlation;
receive an excitation pulse via the probe electrode within a given touch-sensing frame;
compute an excitation-pulse correlation between the excitation pulse received and a facsimile of the excitation pulse; and
maintain synchronization between the local row counter and the remote row counter based on the excitation-pulse correlation.

16. The touch-sensing system of claim 15, wherein the sensory logic is configured to locate a position corresponding to a maximum value of the synchronization-pulse correlation.

17. The touch-sensing system of claim 15, wherein the sensory logic is configured to identify a first occurrence of an above-threshold position in the synchronization-pulse correlation.

18. The touch-sensing system of claim 15, wherein the sensory logic is further configured to compute early and late correlations between the synchronization pulse sequence received and the facsimile to maintain synchronization between the local row counter and the remote row counter.

19. A touch-sensing system comprising:
- an active stylus including a probe electrode and associated sensory logic;
- the sensory logic configured to:
    - receive a synchronization pulse sequence via the probe electrode between consecutive touch-sensing frames of a capacitive touch screen;
    - compute a synchronization pulse-sequence correlation between the synchronization pulse sequence received and a facsimile of the synchronization pulse sequence;
    - synchronize a local row counter of the sensory logic to a remote row counter of the capacitive touch screen based on the synchronization pulse-sequence correlation;
    - receive an excitation pulse via the probe electrode within a given touch-sensing frame;
    - compute an excitation-pulse correlation between the excitation pulse received and a facsimile of the excitation pulse; and
    - maintain synchronization between the local row counter and the remote row counter based on the excitation-pulse correlation.

* * * * *